F. C. SANFORD & A. E. BRION.
APPARATUS FOR WELDING THE MEETING EDGES OF METALLIC ARTICLES.
APPLICATION FILED AUG. 14, 1909.
950,626.
Patented Mar. 1, 1910.
4 SHEETS—SHEET 1.
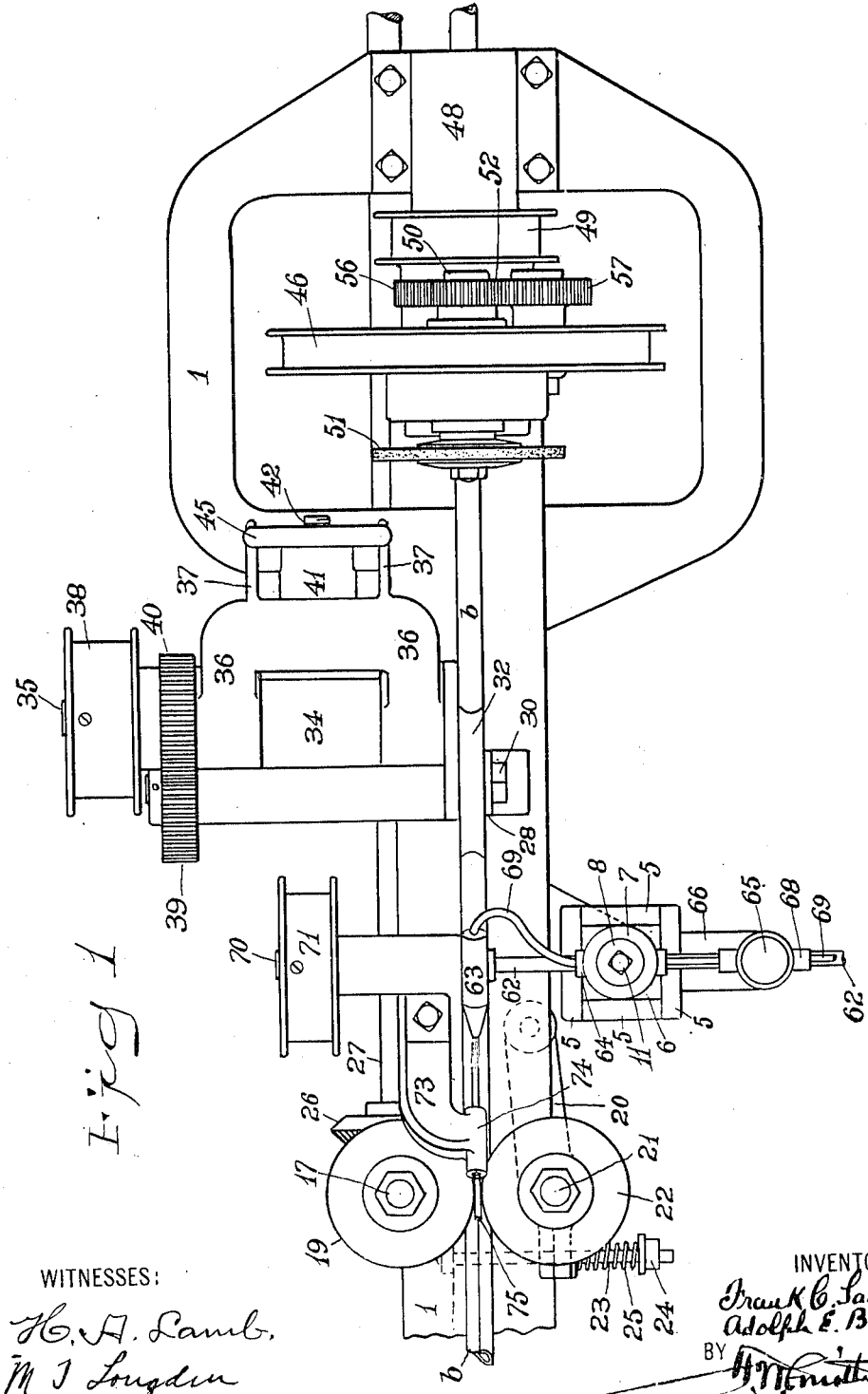

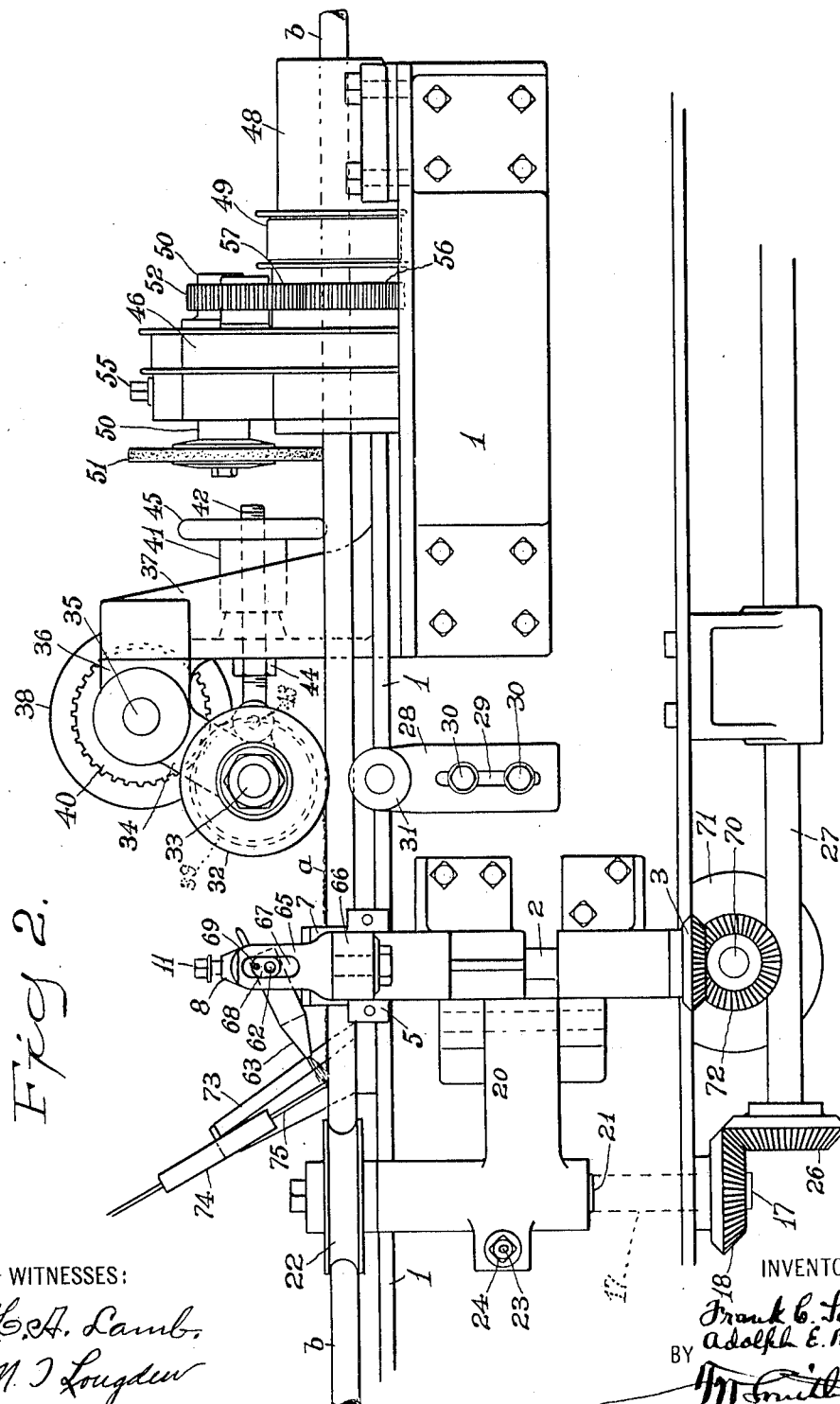

F. C. SANFORD & A. E. BRION.
APPARATUS FOR WELDING THE MEETING EDGES OF METALLIC ARTICLES.
APPLICATION FILED AUG. 14, 1909.
950,626.
Patented Mar. 1, 1910.
4 SHEETS—SHEET 3.
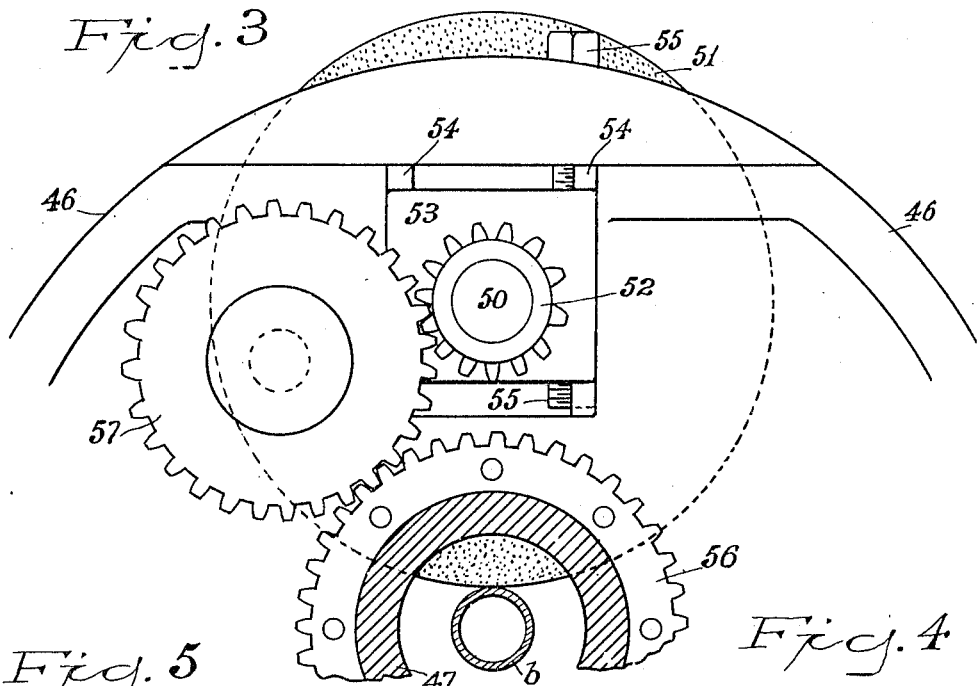
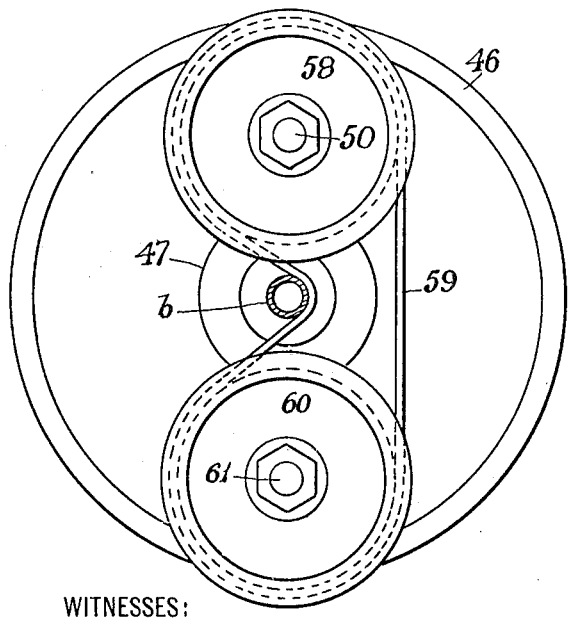
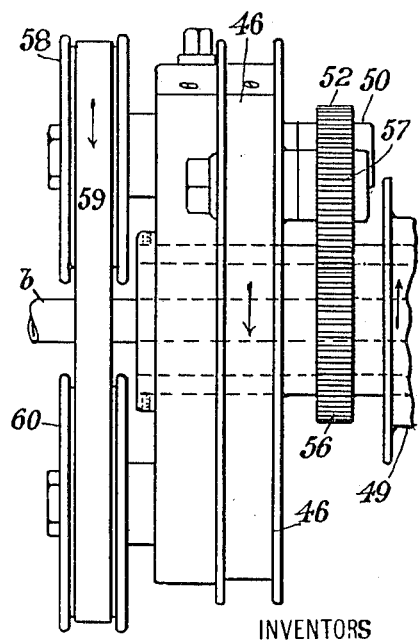
WITNESSES:
INVENTORS
Frank C. Sanford
Adolph E. Brion
BY
ATTORNEY F. C. SANFORD & A. E. BRION.
APPARATUS FOR WELDING THE MEETING EDGES OF METALLIC ARTICLES.
APPLICATION FILED AUG. 14, 1909.
950,626.
Patented Mar. 1, 1910.
4 SHEETS—SHEET 4.
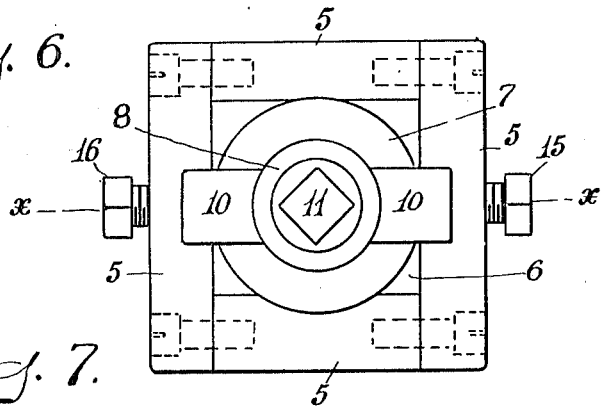
Fig. 6.
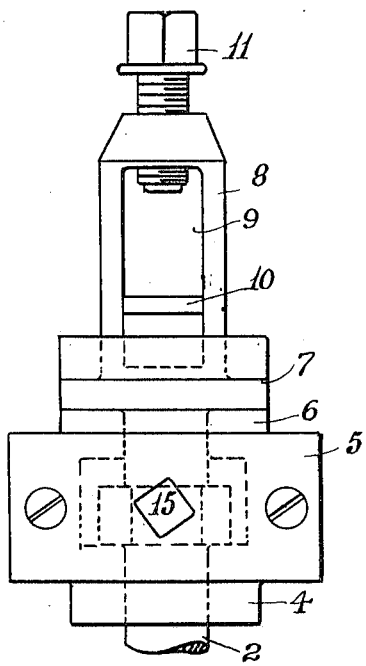
Fig. 7.
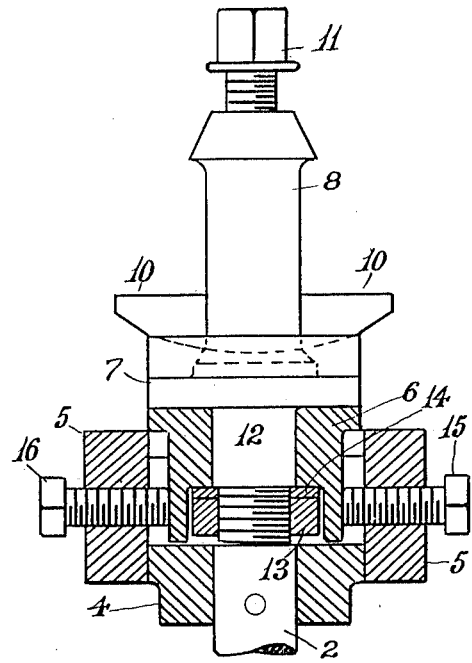
Fig. 8.
Fig. 9.
Fig. 10.
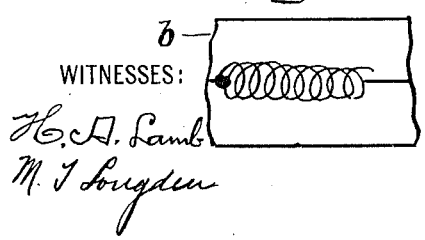
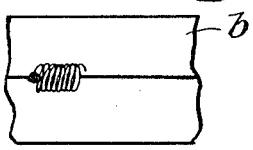
WITNESSES:
H. A. Lamb
M. J. Lougden
INVENTORS
Frank C. Sanford
Adolph E. Brion
BY
ATTORNEY

UNITED STATES PATENT OFFICE.

FRANK C. SANFORD, OF BRIDGEPORT, CONNECTICUT, AND ADOLPH E. BRION, OF BROOKLYN, NEW YORK.

APPARATUS FOR WELDING THE MEETING EDGES OF METALLIC ARTICLES.

950,626.   Specification of Letters Patent.   Patented Mar. 1, 1910.

Application filed August 14, 1909. Serial No. 512,882.

*To all whom it may concern:*

Be it known that we, FRANK C. SANFORD, a citizen of the United States, residing at Bridgeport, county of Fairfield, State of Connecticut, and ADOLPH E. BRION, a citizen of the United States, residing at Brooklyn, county of Kings, State of New York, have invented certain new and useful Improvements in Apparatus for Welding the Meeting Edges of Metallic Articles; and we do hereby declare the following to be a full, clear, and exact description of the invention, such as will enable others skilled in the art to which it appertains to make and use the same.

Our invention relates to apparatus for welding the meeting edges of metal articles, but more particularly has reference to the automatic, continuous and progressive welding of the meeting edges of a metal tube.

The object of our invention is to do away with hammering or pressure as a part of the welding operation, and to perform the welding process by means of a blow pipe flame applied to the meeting edges of the tube while the latter is continuously fed beneath the flame, and furthermore, to remove all surplus stock due to the welding operation and to polish the tube throughout its area.

With these ends in view our invention consists in the details of construction and the arrangement and operation of parts hereinafter fully described and then particularly pointed out in the claims which conclude this description.

In the accompanying drawing which forms a part of this application Figure 1 is a plan view of an apparatus used for carrying out our invention; Fig. 2 a side elevation thereof; Fig. 3 a detail broken elevation partly in section of the polishing means shown at Fig. 2; Fig. 4 a detail elevation of a modified form of polishing means; Fig. 5 a front elevation of the construction shown at Fig. 4; Fig. 6 a detail plan view of the blow pipe carriage; Fig. 7 a side elevation of said carriage; Fig. 8 an elevation partly in section of said carriage, the parts in section being on the line *x, x*, of Fig. 6, and Figs. 9 and 10 are schematic views illustrating the lines in which the blow pipe flame travels in performing the welding operation.

Similar characters of reference denote like parts in the several figures of the drawing.

Prior to our improvement, the meeting edges of metallic articles have usually been welded together by applying a flame until the edges have been brought to a welding heat and then hammering these edges so that they would unite, an anvil being provided beneath said edges to coöperate with the hammering or pressure in effecting the welding.

It has hitherto been quite impossible to weld meeting metallic edges by means of a blow pipe flame steadily applied along these edges as the latter were fed beneath the flame, because the flame would merely cut out the stock and no material welding whatever would be performed.

Our improvement, broadly considered, consists in directing a blow pipe flame in continuous intersecting paths that traverse the edges to be welded, the puddles of metal successively formed by the blow pipe flame as the tube is fed along being continually intersected by the paths in which the flame is directed, the result being that the welded joint has the appearance of "fish scales" since the metal is being continually forced back upon itself, all of which will be readily understood from the following description.

1 is the frame of the apparatus in which is suitably journaled a vertically disposed shaft 2 which carries a bevel gear 3 at its lower end and has a collar 4 secured to its upper extremity. Inclosing this collar is a box 5 formed of four pieces bolted together, the relation between said collar and box being such that the latter will partake of the movements of the shaft 2, and within this box is a block 6 that does not fill the space within said box but is capable of being shifted to and fro therein.

The carriage which supports the blow pipe comprises a base 7 and post 8 rising therefrom, said post having an opening 9 extending through the same from side to side for the purpose of accommodating the blow pipe, through which opening extends a pillow block 10 which has a convex bottom that rests upon a concave seat in said base and affords a suitable support for the blow pipe, a set screw 11 driven through the top of the post 8 affording means whereby the blow pipe is held securely in position. Depending from the base 7 through a perforation in the block 6 is a stud 12 whose lower extremity is threaded, and a nut 13 is driven on said threaded end with a washer 14 interposed between said nut and the bottom of the block 6, the function of this nut being merely to prevent the accidental withdrawal of the stud 12 from said block, the stud being free to turn axially within the latter.

15, 16, are bolts driven through the box 5 against opposite sides of the block 6, and by relaxing one of the bolts and driving the other bolt inwardly so as to shift the block 6 the axis of the stud 12 will be thrown out of line with the axis of the shaft 2, and as the latter revolves the block 6 will become an eccentric and the post 8 will be carried to and fro by the movements of this block in the manner and for the purpose presently to be explained.

The tube to be welded is supported and fed by a series of rolls and the meeting edges of the tube are uppermost so as to be in position for ready welding by the blow pipe, and although we employ quite a number of these pairs of rolls in order to properly support and feed tubes of considerable length, we have illustrated and will describe only one pair of these rolls since the remaining pairs are mere duplications.

Suitably journaled in the frame of the machine is a shaft 17 which carries a bevel gear 18 at its lower extremity and to whose upper end is fixed a grooved roll 19 adapted to snugly fit the tube $b$, while journaled within an arm 20 pivoted to the frame of the machine is a shaft 21 carrying at its upper end a grooved roll 22 likewise snugly fitting the tube immediately opposite to the roll 19. Extending loosely through the arm 20 is a pin 23 whose inner end is fixed to the frame of the machine while a nut 24 is driven on its outer end against a coil spring 25 interposed between said nut and the arm itself so that it will be clear that the roll 22 will press resiliently against the tube, this roll being an idler while the roll 19 is given a positive rotation through the medium of the bevel gear 26 which is carried by a shaft 27 and engages the bevel gear 18, said shaft being connected up with any suitable source of power not herein shown. But it will be readily understood that while these rolls for supporting and feeding the tube are quite essential, nevertheless it is immaterial for the purposes of our invention how these rolls are constructed, arranged and operated, and we therefore do not wish to be limited to mechanical details in this respect, it being merely necessary that we should employ some system of supporting and feeding rolls.

As the tube is fed along by the action of the rolls, the fused metal incidental to the welding process by the action of the blow pipe hereinafter to be described piles up along the meeting edges of the tube in masses deposited one upon the other after the manner of "fish scales," and it becomes necessary to remove this protruding mass and therefore we have provided a milling cutter which operates to shear away this surplus so as to leave the tube comparatively smooth at its point of welding, and this milling cutter and the operation of the same we will now describe.

28 is a plate which has an elongated slot 29 through which latter bolts 30 are driven into the frame 1 whereby the plate may be adjustably secured to the latter, and 31 is a grooved roll journaled in vertical disposition on the upper end of said plate and capable of snugly fitting the tube.

32 is a rotary cutter wheel carried by a short shaft 33 that is journaled within the lower end of an arm 34 the upper end of which latter is loosely supported around a short shaft 35 that is journaled within a bracket 36 supported by an upright 37 that rises from the frame of the machine. Carried by the shaft 35 is a power pulley 38, and tight on the shafts 33, 35, are gears 39, 40, that mesh with each other, whereby positive rotation is communicated to the rotary cutter wheel 32.

Driven through a hub 41 that extends from the upright 37 is a threaded rod 42 whose inner extremity is loosely pivoted, as shown in dotted lines at 43, to the arm 34. 44 is a nut around the inner end of this rod 42 and binding against the upright 37 and 45 is a hand wheel driven around the outer extremity of said rod and binding against the hub 41, and by relaxing the nut 44 and driving the wheel 45 the rotary cutter wheel 32 may be brought more firmly against the tube, while the reverse operations of this nut and wheel will tend to throw said cutter wheel away from the tube, and these operations are likewise brought into play in adjusting the cutter to tubes of different sizes. The roll 31 likewise acts as a support for the tube, and as said tube is fed toward the cutter wheel 32 the latter will mill or shear away the surplus metal left by the welding operation, and for the purposes of a clearer understanding of the function of this cutter wheel we have denoted this surplus by $a$.

We have provided means for polishing the welded joint as well as the entire area of the tube so that the latter may present a finished appearance, and this polishing operation follows the action of the rotary cutting wheel, and although it is not actually essential to polish the welded tube, nevertheless we deem it advisable to do so utilizing certain preferred instrumentalities which we will now describe.

Referring particularly to Figs. 1, 2, and 3, of the drawing, 46 is a large power pulley loosely journaled on a hollow hub 47, which latter is in turn journaled within a box 48 secured to the frame of the machine, and 49 is a power pulley carried by said hub. 50 is a short shaft journaled to the wheel 46 eccentric to the axis thereof, and 51 is a polishing wheel carried by the inner end of said shaft while the outer extremity of the latter carries a pinion 52. As a matter of fact, the shaft 50 is journaled within an adjustable block 53 capable of sliding within a recess 54 formed in the wheel 46, a threaded bolt 55 being driven through the periphery of said wheel and engaging a threaded opening in said block whereby the latter may be adjusted to vary the distance between the shaft 50 and the axial center of said wheel 46, but this adjustment is a matter of mere mechanical detail, and, moreover, in many instances, the adjustable block may be dispensed with and the shaft 50 journaled directly within the wheel 46 itself. 56 is a gear carried by the hub 47 and 57 is an idle gear carried by the wheel 46 and meshing with the pinion 52 and gear 56, whereby motion may be communicated from the gear 56 to said pinion, thereby effecting the rotation of the polishing wheel 51. The tube $b$ extends through the hub 47, and the polishing wheel 51 acts directly against the surface of the tube, and as the wheel 46 rotates the polishing wheel will be carried bodily around the pipe and at the same time will have an independent revolution on its axis, so that it will be clear that as the tube is fed along it will be polished throughout its area.

In some instances we deem it advisable to use a belt polisher instead of a wheel, and at Figs. 4 and 5 we have illustrated a construction wherein a pulley 58 is substituted for the polishing wheel at the inner end of the shaft 50 while a belt 59 connects this pulley with an idle pulley 60 carried by a short shaft 61 journaled to the wheel 46 eccentric to the axis thereof. This belt is a polishing belt and it bears against the tube $b$ in the manner shown at Fig. 5, so that as the wheel 46 revolves the entire area of the tube will be polished. Of course it will be readily understood that various constructions may be employed for the purpose of polishing the tube all of which would be within the range of ordinary mechanical skill, and therefore we do not wish to be limited to the employment of any particular means for polishing the tube.

As the welding agent we employ a blow pipe which is connected by a flexible tube with a generating box within which latter the oxygen is made, and the latter under its own pressure caused by generating passes through this tube into the blow pipe, and we also use a flexible tube by means of which a supply of a suitable gas is fed to the blow pipe, and while we do not wish to be limited to the use of any particular gas we prefer to use acetylene gas, and in connection with the blow pipe we provide a proper support for holding and feeding rods of soft metal all of which we will now explain.

62 is the blow pipe having at its inner end a suitable nozzle 63, and 64 is a housing through which said pipe extends, which housing is introduced within the opening 9 in the post 8 and is seated upon the pillow block 10, the set screw 11 being driven against the top of this housing to hold the same in position. The angle at which the blow pipe extends from the post 8 is determined by adjusting the pillow block on its rocking seat, and the blow pipe itself is turned axially to properly deflect the nozzle 63 into its proper position with respect to the meeting edges of the tube to be welded.

65 is a post that is swiveled upon an extension 66 from the frame 1, which post has a vertically disposed elongated opening 67 extending therethrough. The posts 8 and 65 as well as the openings 9 and 67 are in substantially the same vertical plane, and a housing 68 is contained within the opening 67 and within this housing extends the blow pipe.

The passage of the blow pipe through the swiveled post 65 permits of the to and fro and sidewise movements of the blow pipe, and at the same time prevents the latter from being carried around in a circle which might possibly happen owing to the fact that the base of the blow pipe has a swivel connection with the rotary eccentric block 6. We have not shown or described any generating box or flexible tube connected with the blow pipe since these parts are ordinary and have nothing to do with our invention proper.

69 is a flexible tube which communicates with the nozzle 63 and passes through the housings 64, 68, and communicates with any suitable gas supply.

70 is a shaft carrying at one end a power pulley 71 and at the other end a bevel gear 72 which meshes with the gear 3 and thereby imparts rotary motion to the shaft 2 and the parts carried thereby.

As hereinbefore explained, after the block 6 has been adjusted so that the axis of the stud 12 will be eccentric with respect to the axis of the shaft 2, the rotation of the latter will cause the post 8 and the blow pipe carried thereby to be moved to and fro in paths which are ovate in their nature, and these paths will constantly traverse the meeting edges of the tube to be welded.

A bracket 73 is secured to the frame of the machine and is provided with an inclined socket 74 through which latter loosely extends a rod 75 of soft metal, as iron for instance, the lower end of which rod always rests by gravity upon the meeting edges of the tube in proximity to the extreme end of the nozzle 63, so that as the blow pipe flame issues from the nozzle it will impinge against the lower end of the rod 75 and melt the same away, the melted metal being deposited upon the tube and intermingling with the fused metal along the meeting edges to be welded.

The operation of our improvement is as follows:—The tube b is constantly fed beneath the blow pipe flame as hereinbefore set forth, and as the eccentric block 6 is carried around by the rotation of the shaft 2 the blow pipe flame will be caused to travel across the edges to be welded first on one side and then on the other for a predetermined distance depending of course on the throw given by the block 6. This will cause said flame to be directed in progressive and retrogressive continuous paths along the edges to be welded, and these paths will intersect as shown at Figs. 9 and 10 where we have indicated the initial fusing by a black dot, the course of the blow pipe flame being denoted by ovate intersecting lines. As the blow pipe flame describes its ovate paths athwart the meeting edges of the tube, these paths will constantly intersect and the metal which has been fused during the progressive travel of the blow pipe will be intersected by the flame at the retrogressive movements of said pipe and will be driven back upon previously fused metal, the result being the "fish scale" appearance hereinbefore referred to.

The presence of the soft metal rod 75 insures a sufficient quantity of fused metal so that the welding will be perfect and uniform in all respects.

The speed at which the tube is fed beneath the blow pipe depends of course upon the demands of the occasion, and variation in this respect is a mere matter of detail involving no invention, and in this connection we desire to say that it would be fully within the province of our invention to employ an antithetic construction in which the tube remained stationary while the blow pipe had a progressive movement in addition to the movements caused by the eccentric block 6. Of course it will be readily understood that the intersecting paths traversed by the blow pipe nozzle may be varied by the adjustment of the block 6, or by changing the rate of speed at which the tube is fed beneath the flame, and therefore these paths may be as is shown at either Fig. 9 or Fig. 10, the former illustrating the path traversed by said nozzle either when the tube is fed faster or when the block 6 is adjusted with its axis farther away from the axis of the shaft 2, while Fig. 10 illustrates the path described by said nozzle either when the tube is fed slower or when the axis of the block 6 is nearer the axis of the shaft 2.

In very many details to which attention has not hitherto been specifically directed, our improvement may be varied or modified without departing from the spirit of our invention, the gist of which resides in the broad idea of welding the meeting edges by a blow pipe flame which traverses said edges in continuous intersecting paths.

Having thus described our invention what we claim as new and desire to secure by Letters Patent is:—

1. In an apparatus for welding metallic meeting edges by a blow pipe flame, the combination with means for feeding the parts to be welded beneath the flame, of means for directing the flame in continuous intersecting paths which traverse the edges to be welded.

2. In an apparatus for welding metallic meeting edges by a blow pipe flame, the combination of means for properly presenting the edges to the action of the flame, of means for directing said flame against the metal in continuous progressive and retrogressive intersecting paths which traverse the edges to be welded.

3. In an apparatus for welding the meeting edges of a metallic tube by a blow pipe flame, the combination of means for continuously feeding the tube at a predetermined speed, of means for directing the flame of the blow pipe athwart said edges in reversely extending intersecting paths.

4. In an apparatus for welding the meeting edges of a metal tube by a blow pipe flame, the combination of means for causing the blow pipe flame to continuously traverse the edges to be welded in curved intersecting paths, with instrumentalities for feeding the tube at a predetermined speed beneath said flame.

5. In an apparatus for welding the meeting edges of a metal tube by a blow pipe flame, the combination of means for constantly delivering soft metal at the welding points, means for causing the blow pipe flame to traverse the edges to be welded in circular paths which intersect each other and continually pass through previously fused metal, and means for feeding the tube at a predetermined speed beneath said flame.

In testimony whereof we affix our signatures in presence of two witnesses.

FRANK C. SANFORD.
ADOLPH E. BRION.

Witnesses:
SWAN B. BREWSTER,
F. W. SMITH, Jr.